United States Patent
Diamant et al.

(10) Patent No.: US 11,188,302 B1
(45) Date of Patent: Nov. 30, 2021

(54) TOP VALUE COMPUTATION ON AN INTEGRATED CIRCUIT DEVICE

(71) Applicant: Amazon Technologies, Inc., Seattle, WA (US)

(72) Inventors: Ron Diamant, Albany, CA (US); Randy Renfu Huang, Morgan Hill, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/267,031

(22) Filed: Feb. 4, 2019

(51) Int. Cl.
*G06F 7/24* (2006.01)
*G06N 3/063* (2006.01)
*G06F 9/50* (2006.01)
*G06F 9/48* (2006.01)

(52) U.S. Cl.
CPC .............. *G06F 7/24* (2013.01); *G06F 9/4812* (2013.01); *G06F 9/5027* (2013.01); *G06N 3/063* (2013.01)

(58) Field of Classification Search
CPC ........................................................ G06F 7/24
See application file for complete search history.

(56) References Cited

U.S. PATENT DOCUMENTS

| 4,446,452 | A | * | 5/1984 | Munter | G06F 7/026 708/207 |
| 5,122,979 | A | * | 6/1992 | Culverhouse | G06F 7/02 340/146.2 |
| 8,296,306 | B1 | * | 10/2012 | Whang | G06F 7/22 707/752 |
| 2008/0288565 | A1 | * | 11/2008 | Lin | G06F 7/24 708/207 |

OTHER PUBLICATIONS

Ilyas et al., "A Survey of Top-k Query Processing Techniques in Relational Database Systems," ACM Journal, Oct. 2008, pp. 1-61, vol. 40, Issue No. 4, University of Waterloo, Waterloo, ON, Canada.

\* cited by examiner

*Primary Examiner* — Chuong D Ngo
(74) *Attorney, Agent, or Firm* — Weaver Austin Villeneuve & Sampson LLP

(57) ABSTRACT

Top-k is a process by which the largest elements among a set of elements is found. In various implementations, a top-k computation can be executed by a neural network accelerator, where the top-k computation is performed using a process that makes use of the accelerators memory array. A set of numerical values on which to perform top-k can be stored in the memory array. The accelerator can locate the maximum value from among the set of numerical values, and can store the maximum value back into the memory array. The accelerator can next remove the maximum value from the set of numerical values, so that a next largest value can be found. To remove the maximum value, the accelerator can write a value representing negative infinity to the memory array at each location of the maximum value.

19 Claims, 10 Drawing Sheets

700

Reading, from a memory of an integrated circuit device, a first set of numerical values, wherein the integrated circuit device uses the memory to store values being operated on and results of operations on the values.
702

Determining, using a computational engine of the integrated circuit device, a first numerical value from among the first set of numerical values, wherein the first numerical value is a maximum value from among the first set of numerical values
704

Writing the first numerical value to the memory at a first memory location corresponding to an index in a second set of numerical values
706

Determining, using the computational engine, an index in the first set of numerical values of an occurrence of the first numerical value
708

Writing, to the memory, a value representing negative infinity at the index in the first set of numerical values
710

Outputting the second set of numerical values, the second set of numerical values including a set of largest values from among the first set of numerical values
712

FIG. 7

TOP VALUE COMPUTATION ON AN INTEGRATED CIRCUIT DEVICE

BACKGROUND

Top-k is a process by which the largest elements among a set of elements is found. The "k" refers to the number of largest elements that is being determined. For example, a top-1 process returns the largest element, while a top-3 process returns the largest three elements. In some examples, the top-k process can return the largest elements including duplicates, or can return only unique instances of the largest elements (in which case, duplicates are eliminated).

Top-k is used in various contexts where ranking of results may be needed. In artificial intelligence applications, such as image recognition, top-k can be used to reduce a list of probable outcomes to the most likely outcome. For example, a neural network trained for recognizing dogs, cats, boats, and birds can output a probability that a particular image includes a dog, a cat, a boat or a bird. In this example, top-k can be applied to select the highest probability determined by the neural network. As another example, a neural network trained for machine translation can output a probability that a translated word means "wrong," "mistaken," "faulty," "abusive," or "wry." In this example, top-k can be used to select the highest three (for example) ranked translations, which can then each be used to attempt translation of an entire phrase or sentence. Top-k can also be used for other purposes, such as in a feedback system, to check the performance (in terms of correctness) of a neural network.

BRIEF DESCRIPTION OF THE DRAWINGS

Illustrative examples are described below with reference to the following figures:

FIG. 7 includes a flowchart illustrating an example of a process for determining the top-k values in a set of numerical values;

DETAILED DESCRIPTION

Figure 1:
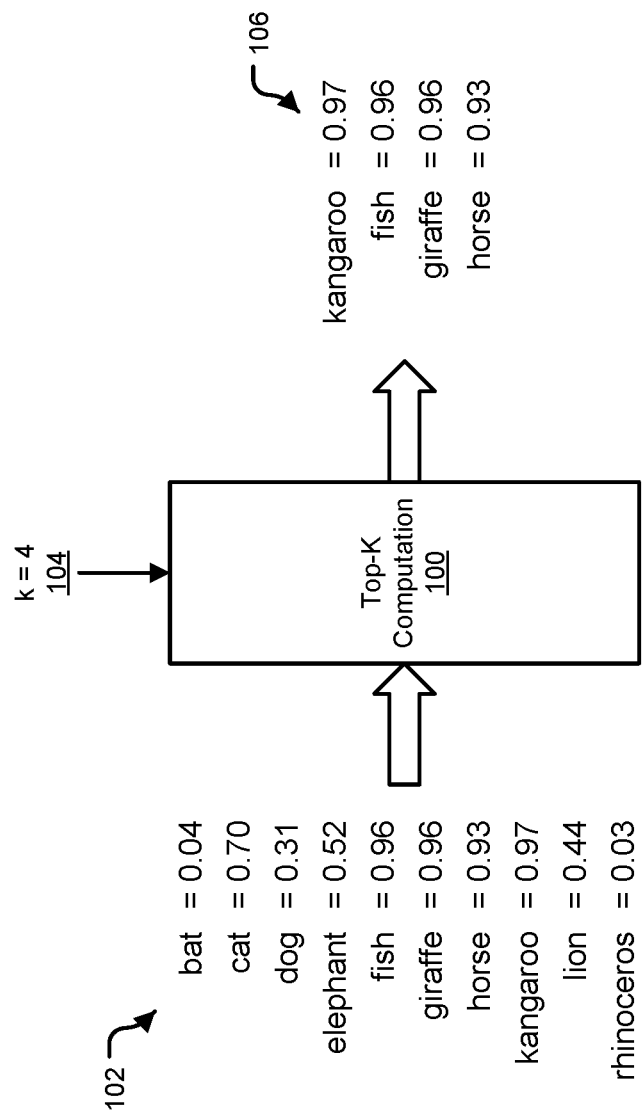
FIG. 1 includes an illustration showing an example output of performing a top-k computation on a set of inputs.

A neural network processor is a type of integrated circuit device that is purpose built to execute neural networks. Executing a neural network (referred to as performing an inference) can require large numbers of simpler operations such as add and multiply, which can be performed in parallel and thus can be efficiently executed by hardware that supports large numbers of parallel computations. While a general purpose processor can execute a neural network, general purpose processors may be designed for greatest flexibility in the types of operations these processors can perform, rather than for large amounts of parallel computations. Graphics Processing Units (GPUs) can also be used to execute a neural network, but may be optimized for parallel computation on unrelated vectors of data, while neural networks tend to require tensor operations, such as multiplication of arrays and accumulation of array values. Additionally, graphics processing units may be expensive, in terms of monetary cost and operating cost, to add to a computing device, while neural network processors may be much more inexpensive. In some examples, neural network processors are also referred to as neural network accelerators.

Because neural network accelerators are optimized around performing large numbers of parallel add and accumulate operations, a neural network accelerator may lack some of the hardware that a general purpose may have, and that may enable the general purpose processor to be a versatile device. For example, a neural network accelerator may not have a register file. In a general purpose processor, registers in a register file serve as temporary storage for data on which the general purpose processor is operating. The register file is often the last point of storage before data is fed into a computational engine of the general purpose processor, and is also where the results from a computation engine may be stored. A register file may be implemented using a fast memory type (such as a Static Random Access Memory (SRAM)). The register file may allow, for example, writing of one value and reading of two to three values in the same clock cycle, so that two or three operands for a computation can be read at the same time. Because the register file is intended to store only data that is about to be used, the register file is usually only one data word in width. To store data that may be needed less immediately but soon, a general purpose processor can have other on-board memory, such as a cache.

While a general purpose processor may perform a computation on two or three, or perhaps as many as a dozen operands at a time, a neural network accelerator may perform a computation on over one hundred operands in a single clock cycle. Thus, a register file may not be a practical component for storing the data that the neural network accelerator will feed into the accelerator's computational array. Instead, the neural network accelerator can have an array of memory banks or partitions, with each bank being individually readable and writeable, and a separate bank being provided to feed data into each row of the computational array. Having an array of memory banks can avoid the difficultly of implementing a single memory that has a large number of read and write ports. Additionally, each memory bank can perform the functions of both a register file and an on-board cache, and can thus reduce the amount of data copying occurring within the device and the amount of space needed for memories.

A top-k computation, however, generates intermediate values in the course of computing the final result. A general purpose processor can store these intermediate values in a register file. The neural network accelerator may not have a place for intermediate values, other than the memory banks. One solution for a computing system that uses a neural network accelerator is for the top-k computation to be performed in software, rather than on the accelerator. Performing the top-k computation in software, however, may be slower than if the computation is performed by the neural network accelerator. For example, the neural network accelerator may have idle resources, while the computing system's main processor is being taken away from other tasks while executing the top-k computation. Additionally, other computations to be performed by the neural network accelerator may be dependent on the result of the top-k computation, and thus the neural network accelerator may have to wait while the computation is performed by the software.

In various implementations, a top-k computation can be executed by a neural network accelerator, where the top-k computation is performed using a process that makes use of the accelerator's memory array. A set of numerical values on which to perform top-k computations can be stored in the memory array. Using a computational engine that is capable of operating on a set of inputs at a time, the accelerator can locate the maximum value from among the set of numerical values, and can store the maximum value back into the memory array. The process can next remove the maximum value from the set of numerical values, so that a next largest value can be found. To remove the maximum value, the process can write a value representing negative infinity to the memory array at each location of the maximum value. When the set of numerical values is read again, the previous maximum values are no longer present, and a next largest value can be determined. In various examples, the process for computing top-k can be embodied in a program or a set of program instructions for the accelerator.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes an illustration showing an example output 106 of performing a top-k computation 100 on a set of inputs 104. In this example, the set of inputs 104 includes a list of labels with a value or score assigned to each. The set of inputs 104 can represent, for example, application of the softmax function on a set of results to generate a probability distribution. The set of inputs 104 can be represented as a vector of labels and values, as follows: ("bat=0.04," "cat=0.70," "dog=0.31," "elephant=0.52," "fish=0.96," "giraffe=0.96," "horse=0.93," "kangaroo=0.97," "lion=0.44," "rhinoceros=0.03").

In the example of FIG. 1, the top-k computation 100 is given an input of k=4, meaning that the top-k computation 100 is being instructed to find the four largest from among the set of inputs 104. The top-k computation 100 thus outputs the vector ("kangaroo=0.97," "fish=0.96," "giraffe=0.96," "horse=0.93"). This output 106 can represent the four best matches to a search query, the four most likely objects recognized in an image, or the four most probably translations for a word, among other examples.

In the example of FIG. 1, the top-k computation 100 extracted from the set of inputs 104 the numerically largest values, which included two instances of "0.96." In other examples, the top-k computation 100 can determine the largest unique values. In the example of FIG. 1, the top four unique values are 0.97, 0.96, 0.93, and 0.70. In some examples, the top-k computation may be able to provide an index or reference indicating the labels that have these values.

Figure 2:
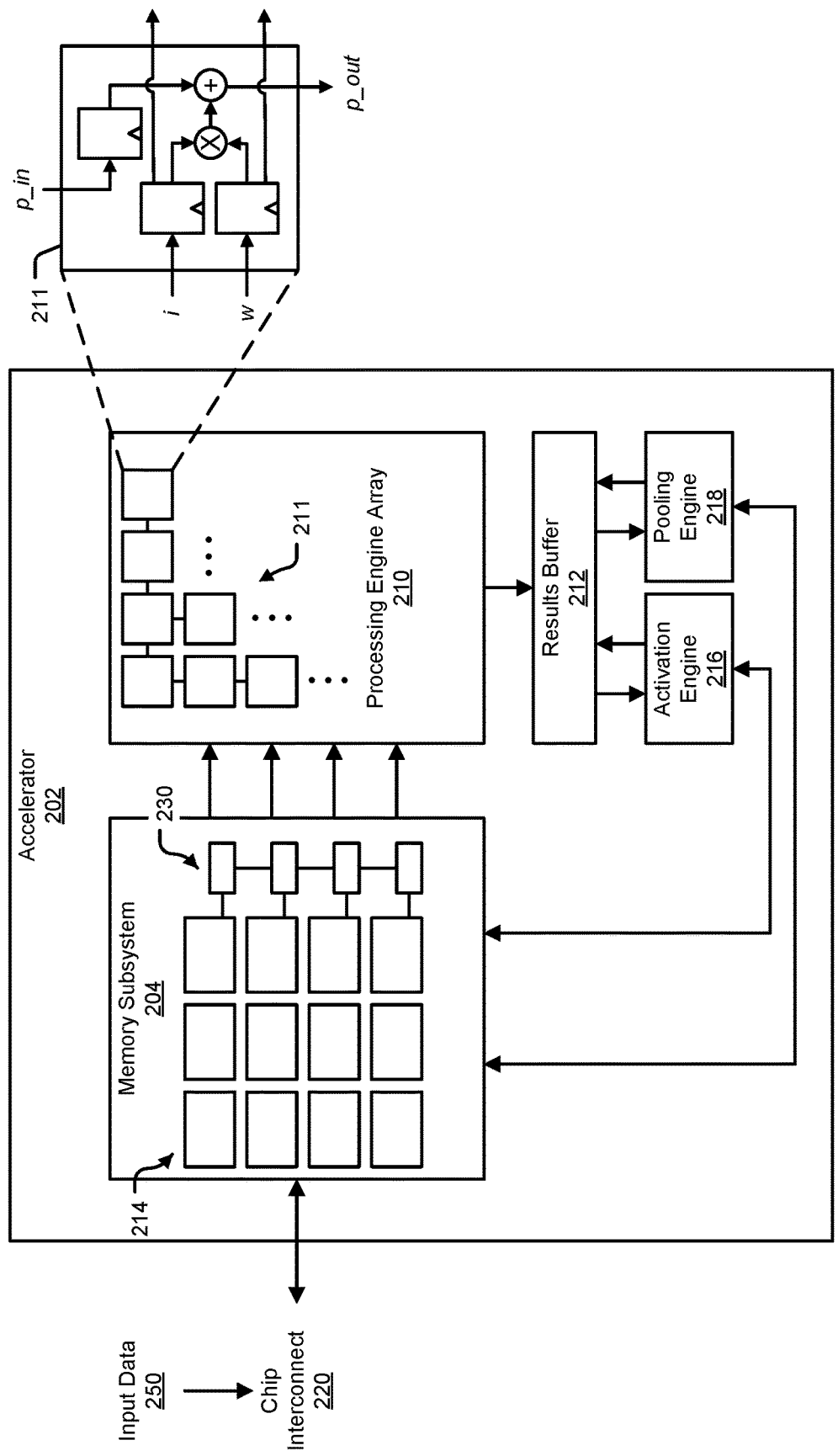
FIG. 2 includes a block diagram of an integrated circuit device that can be used to perform a top-k computation.

FIG. 2 includes a block diagram of an integrated circuit device that can be used to perform a top-k computation. The example of FIG. 2 includes an accelerator 202. The accelerator 202 is an example of an integrated circuit device with memory that has been physically divided into separate memory banks 214, where different memory clients (e.g., different components of the accelerator 202 that use memory) can be assigned to different memory banks 214, as discussed further below. In various examples, the accelerator 202 is an integrated circuit component of a processor. The processor can have other integrated circuit components, including additional accelerators.

In various implementations, the accelerator 202 can include a memory subsystem 204 and a computational array, which can also be referred to as a processing engine array 210. When in operation (e.g., when computing a result for a set of input data 250), the processing engine array 210 can read values from the memory subsystem 204. The processing engine array 210 can output computation results to a results buffer 212. In some cases, the example accelerator 202 can perform an activation function (using an activation engine 216) and/or pooling (using a pooling engine 218) on the results from the processing engine array 210, before the results are written to the memory subsystem 204.

In various implementations, the memory subsystem 204 can include multiple memory banks 214, which may also be referred to as partitions. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using Static Random Access Memory (SRAM).

In various examples, the memory subsystem 204 can include a set of registers 230 for temporary storage of data. The memory subsystem 204 can include, for example, a register for each of the memory banks 214 or for a subset of the memory banks 214. In some examples, there is a one-to-one correspondence between each register and a memory bank, such that data can be moved between one register and a corresponding memory bank, and cannot be moved between the register and a different memory bank. In these and other examples, the memory subsystem 204 may be able to read values from each of the registers 230, independently of the registers' association with the memory banks 214. For example, the registers 230 may be chained, such that a value can be read from one register and be written to a neighboring register. Alternatively or additionally, the memory subsystem 204 can include circuitry that can read from one or more of the registers 230 and can write to one or more of the registers 230.

Using the registers 230, the memory subsystem 204 can, for example, copy data from a set of memory banks 214 and store the data in the registers 230. In this example, the memory subsystem 204 can later copy the data from the registers 230 back into the memory banks 214. The registers 230 may support parallel and serial reads or writes. For example, in parallel mode, the memory subsystem 204 can read two or more of the memory banks 214 at the same time, and store the data that is read into respective registers. In this example, the memory subsystem 204 can also copy data from one or more of the registers into respective memory banks. As a further example, in serial mode, the memory subsystem 204 can read multiple values from one memory bank and store the values into the registers 230, with each value being stored in a different register. In this example, the memory subsystem 204 can also copy values from each of two or more of the registers 230, and write these values to one memory bank. As discussed further below, the memory subsystem 204 can use parallel and serial operations to move data between the memory banks 214.

In various implementations, the memory subsystem 204 can include control logic. The control logic can, for example, keep track of the address spaces of each of the memory banks 214, identify memory banks 214 to read from or write to, and/or move data between the memory banks 214 and a set of registers 230. In some implementations, memory banks 214 can be hardwired to particular clients. For example, a set of memory banks 214 can be hardwired to provide values to the rows of the processing engine array 210, with one memory bank servicing each row. As another example, a set of memory banks can be hired wired to receive values from columns of the processing engine array 210, with one memory bank receiving data for each column.

In various examples, the registers 230 can, alternatively, be located in a different component of the accelerator, such as, for example, the pooling engine 218. In this example, the pooling engine 218 can include control logic for moving data into or out of the registers 230. Other examples of components of the accelerator where the registers can be located include the activation engine 216, the results buffer 212, or another component that is not illustrated here.

The processing engine array 210 is the computation matrix of the example accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the memory subsystem 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, p_in, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214 can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include for example, computing a maximum value, a minimum value, an average value, a median value, a summation, a multiplication, another logical or mathematical combination, or another comparative operation. In various examples, the pooling engine 218 can include multiple execution channels that can operating on values from corresponding columns of the processing engine array 210. In these examples, the pooling engine 218 may be able to perform between 1 and n parallel computations, where n is equal to the number of columns in the processing engine array 210. In some examples, the parallel computations may be vertical, or on only the data in each execution channel. In some examples, a parallel computation may be horizontal, or across two or more execution channels. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

Figure 3:
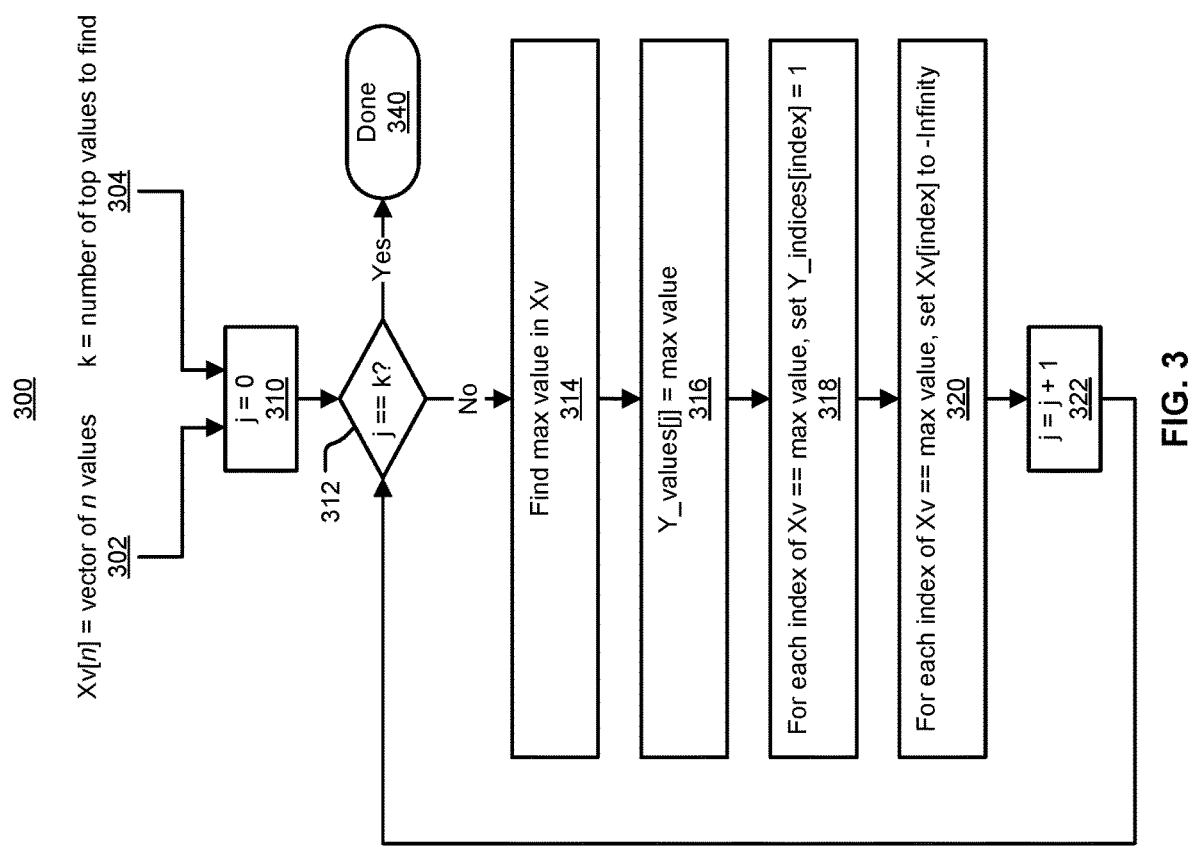
FIG. 3 includes a flowchart illustrating an example of a process for computing the top-k values for a set of input values.

FIG. 3 includes a flowchart illustrating an example of a process 300 for computing the top-k values for a set of input values. In various examples, the process 300 can be implemented as compiler-generated instructions that can be executed by for the example accelerator of FIG. 2. In these examples, the accelerator of FIG. 2 can perform the steps of the process 300 of FIG. 3 when the accelerator executes the instructions. For example, one or more of the steps of the process 300 can be performed by the pooling engine or the activation engine. In some examples, the processing engine array of the accelerator can be used, though the pooling engine and activation engine may more often be idle. Thus, the pooling engine or activation engine may more often be used, and can be used while the processing engine array is working on other computations. In various examples, the process 300 can be embodied as a set of program instructions for the accelerator, where the accelerator will perform the steps of the process 300 when the accelerator executes the instructions.

In various examples, the process 300 receives as inputs Xv[n] 302, which is a vector having of n values. The values in Xv can be, for example, classification results output by a neural network, with each value indicate a probability that a tag or label associated with the value is a correct result. In some examples, the values in Xv are normalized to a value between 0 and 1, or 0 and 100. In some examples, a sum of the values in Xv is 1 or 100.

The process 300 can also receive as an input a k 304, which is a number of top or largest values to find from among the values in Xv. The process 300 finds the k largest values in Xv, and stores these values in a set of values referred to as Y_values. The process 400 also stores the locations, in Xv, where the values in Y_values were found in a mask referred to as Y_indices. Y_values can have k indices and Y_indices can have the same number of indices as Xv (e.g., n indices). In some examples, k can be omitted, in which case the process 300 can find the one largest value from among the values in Xv.

At step 310, the process 300 performs the preliminary step of setting a variable j equal to 0. In this example, j is used to count how many largest values have been found so far. Thus, at step 312, the process 300 test whether j is equal to k. When j is equal to k, the largest k values have been found, and the process 300 terminates at step 340. When j is not equal to k, the process 300 proceeds to step 314.

At step 314, the process 300 finds the maximum value among the values in Xv. To find the maximum value, the process 300 can, for example, instruct the accelerator to compare each value in Xv to each other value in Xv until the largest is found. In some cases, Xv may include more than one value equal to the maximum value (e.g., two or more occurrences of the same number).

At step 316, the process 300 saves the maximum value found at step 314 to an index j in Y_values. The Y_values can be a set of memory locations in the memory array of the accelerator, allocated for storing the results of the process 300.

At step 318, the process 300 locates each occurrence in Xv of the maximum value found in step 314, and saves the locations in Y_indices. In various examples, Y_indices is a bitmask that has the same number of indices as does Xv. Y_indices can be used to determine the location in Xv for each value that is stored in Y_values. Y_indices can thus be used, for example, to find, in Xv, the top-k values, and possibly also to retrieve information associated with the top-k values, such as labels associated with these values. Each index of Y_indices can initially be set to zero, and, at step 318, the process 300 can, for example, test each index of Xv to determine whether Xv[index]==the max value, and if so, can set Y_indices[index]=1. In some examples, step 318 can be optional.

At step 320, the process 300 can next effectively remove from Xv the maximum value found at step 314. Removing the maximum value from Xv allows for a next largest value to be found should the process 300 return to step 314. The value is not removed, however, and instead is replaced so that the size of Xv is not changed, and the instructions implementing the steps of the process 300 can be the same for each iteration. To remove the maximum value from Xv, the process 300 can, for example, test each index of Xv to see if Xv[index]==the maximum value. The process 300 test each index in case there is more than one occurrence of the maximum value. When Xv[index]==the maximum value, the process 300 sets Xv[index] equal to a value representing negative infinity. Doing so makes Xv[index] now the smallest value among the values in Xv. Negative infinity can be represented, for example, by number with each bit location set to one, or a specially encoded number. In some examples, the process 300 can use zero to make Xv[index] the smallest value, instead of using negative infinity.

At step 322, the process 300 increments j by 1, and then returns to step 312. At step 312, the process 300 may determine to find a next largest number in Xv, or may determine to stop. The result of the process 300, stored in Y_values and Y_indices, can be written to the host memory, and/or can be used for determining a next operation to perform.

Figure 4:
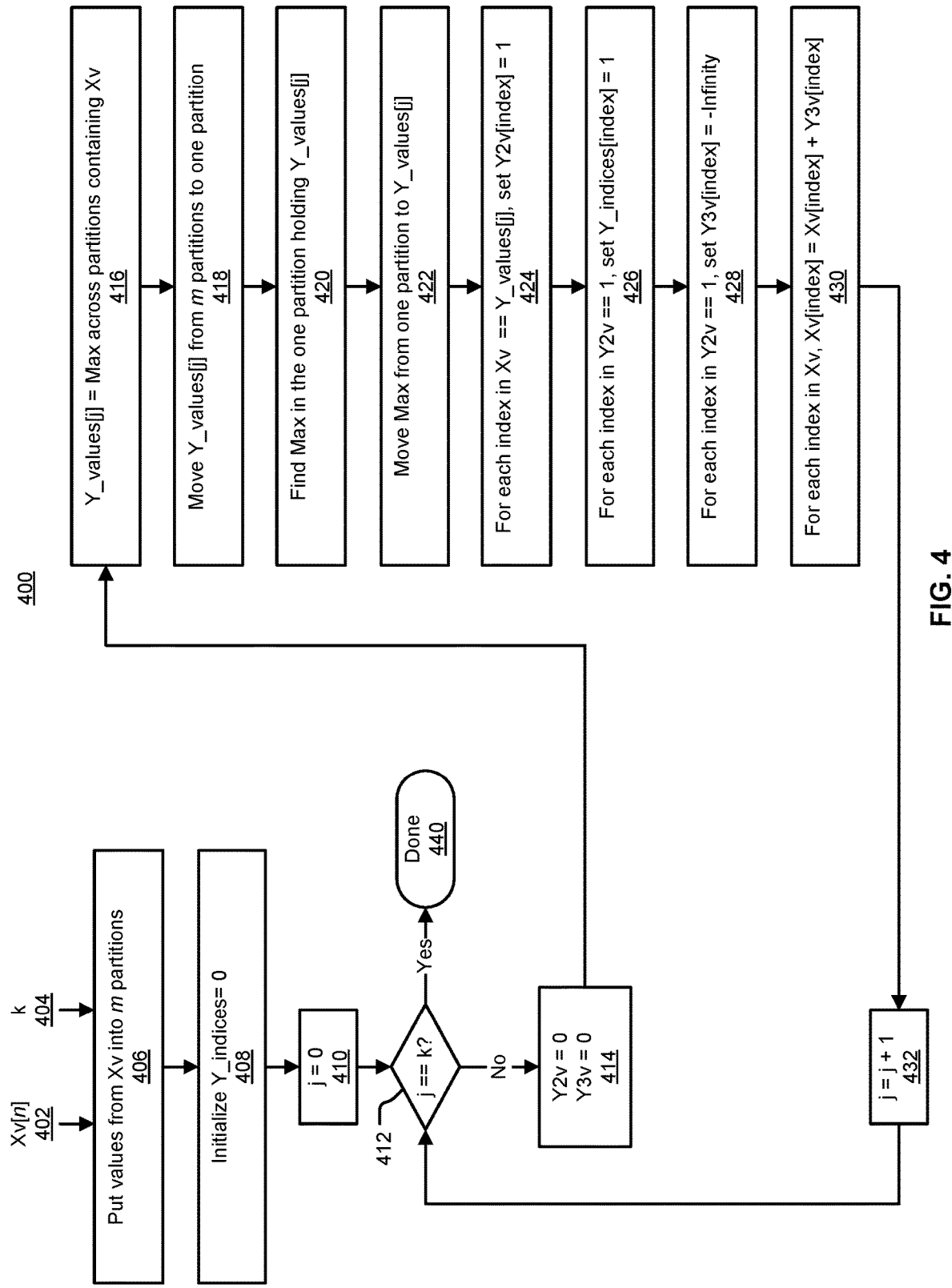
FIG. 4 includes a flowchart illustrating another example of a process for computing the top-k values for a set of input values.

FIG. 4 includes a flowchart illustrating another example of a process 400 for computing the top-k values for a set of input values. In various examples, the process 400 can be performed by a compiler that generates instructions for the example accelerator of FIG. 2. In these examples, the accelerator, when executing the instructions, then performs the steps of the process 400. For example, one or more of the steps of the process 400 of FIG. 4 can be performed by the pooling engine, the activation engine, and/or the processing engine array. In various examples, the process 400 can be embodied as a set of program instructions for the accelerator, where the accelerator will perform the steps of the process 400 when the accelerator executes the instructions.

The example process 400 receives as input Xv[n] 402 and k 404, where Xv[n] 402 is a set of values on which the top-k computation is to be performed and k 404 is the number of largest values to find. In the example of FIG. 4, the process 400 finds the largest unique values in Xv, and stores these values in a set of values referred to as Y_values. In some examples, Y_values is a matrix of values that is as wide as the number of execution engines and is k deep (e.g., if there are 64 execution channels and k is equal to 3, then Y_values is matrix 64 values wide and 3 values high). In these examples, the values of Y_values can be stored across partitions, with each partition being configured to store k values. The process 400 also stores the locations, in Xv, where the values in Y_values were found in a mask referred to as Y_indices. Y_indices can have the same number of indices as Xv (e.g., n indices). In some examples, generation of Y_indices may be optional. Because the process 400 finds the largest unique values, when Xv has multiples of any of these values, (e.g., more than one largest value, more than one second largest value, etc.), this information is not captured in Y_values, but can be determined from Y_indices. For example, comparing Y_indices against the original values in Xv can locate each occurrence of each value in Y_values.

At step 406, the process 400 may perform a preliminary step of placing values from Xv in m different partition of the accelerator's memory array, where m can be less than or equal to the number of execution channels. To perform this step, the process 400 can use instructions such as "Mem-Copy," "RegLoad," "RegStore," or a combination of these instructions. This step may be performed, for example, when the number of values on Xv exceeds the number of execution channels, so that all execution channels can be utilized for the operations at step 416. When the number of values in Xv is less than the number of execution channels, in some examples, the process 400 also executes step 406 to put groups of values of Xv into different execution channels. In these and other examples, the process 400 divides the work of finding the largest value among the available resources so that the work can be performed more efficiently. In some examples, step 406 can be skipped, or step 406 can include putting all the values in Xv into one partition if the values are not already in one partition.

At step 408, the process 400 next performs the preliminary step of setting each index of Y_indices to 0. In various examples, Y_indices is located in one memory partition, and can occupy a set of memory locations that may be, though need not be, contiguous. In some examples, each index in Y_indices is in a different memory partition. Each index in Y_indices can be a 1-bit value, or the smallest-size value that is defined for the instruction set of the accelerator.

At step 410, the process 400 next performs the preliminary step of setting a variable j equal to 0. The variable j is used in the process 400 to count the number of largest values found so far. Thus, at step 412, the process 400 tests whether j is equal to k. When j is equal to k, the process 400 proceeds to step 440 and terminates. When j is not equal to k, the process 400 proceeds to step 414.

At step 414, the process 400 prepares two intermediate variables, Y2v and Y3v, by setting these variables equal to zero. The variables Y2v and Y3v can each be a set of values having the same number of indices as Xv (e.g., n indices). In some examples, each index of Y2v and/or of Y3v are stored in the same partition (with Y2v and Y3v not necessarily being in the same partition), so that the values in Y2v or Y3v can be operated on in the same channel. In some examples, each index of Y2v and Y3v can be stored in a different partition, so that each index is in a separate execution channel.

In some examples, as noted above, all the values of Xv are in one partition when step 416 is reached, in which case step 416 and step 418 can be skipped. Otherwise, at step 416, the process 400 determines the maximum value in each of the m partitions that contain the values of Xv, and stores the result at Y_values[j]. The result of the operations at step 416 is that m maximum values have been determined, one for each partition. In this case, Y_values can be configured such that Y_values[j] (and all other indices of Y_values) is an array of values having an index for each execution channel, so that Y_values[j] can store the m maximum values. The process 400 can perform step 416, for example, using the execution engines in the pooling engine or the activation engine. Performing this step can include, for example, having each execution engine read two values from the partition assigned to the execution engine; having the execution engine perform a max value comparison and writing the result to a respective index of Y_values[j]; having the execution engine read the last max value from the index of Y_values[j] and a next value from the partition, and again performing a max value comparison and writing the result to the respective index of Y_values[j]; and repeating this process until each index of Y_values[j] holds the maximum value from each partition.

In various examples, the operations of step 416 can be performed using one instruction for the pooling or activation engines, which may be called TensorReduceOp. In these examples, the TensorReduceOp instruction can be given Xv as an input the parameter "max" to indicate that the execution engines are to find the maximum value from among the inputs.

The result of step 416 may be a maximum value per partition, but each partition may have a different maximum value. The process 400 thus, at step 418, moves the values in Y_values[j] from the multiple partitions of step 416 to one partition. For example, the process 400 can instruct the execution engines to perform a parallel load of the values in Y_values[j] (using, for example, a "RegLoad" instruction) into the set of registers associated with the different partitions (e.g., the set of registers 230 in the memory subsystem 204, or located elsewhere, as illustrated in FIG. 2), followed by a serial store (using, for example, a "RegStore" instruction) to copy the values from the set of registers into one partition. The process 400 then, at step 420, finds the maximum value from among the values in the one partition. For example, the process 400 can use the TensorReduceOp instruction again, this time indicating the one partition as an input.

Once step 420 is complete, the process 400 has found the largest value from among the original values in Xv. At step 422, the process 400 can move this value from the partition where value was found to Y_values[j], so that Y_values[j] now holds the largest value found so far. In some examples, the max value is copied to each partition that is occupied by Y_values[j]. To move the max value, the process 400 can, for example, instruct the execution engines to perform a serial of load the value into the set of registers for moving data between memory partitions, and then perform a parallel load into the partitions at the locations of Y_values[j].

The process 400 next, step 424, determines the indices in Xv where the max value was found. To find these indices, the process 400 can, for example, check each index of Xv to see if the value at the index is equal to the max value found at step 420. When an index of Xv is equal to the max value, the process 400 sets a corresponding index of Y2v equal to 1. All other indices of Y2v are left at 0, such, on the completion of step 424, Y2v is a bitmask reflecting the indices within Xv where the max value was found. The process 400 can accomplish the operations at step 424 using, for example, an instruction called TensorScalarPtrOp, with the Xv values and the value at Y_values[j] provided as inputs, and a parameter to indicate finding values in Xv that are equal to Y_values[j].

At step 426, the process 400 next uses the Y2v value to update the Y_indices. For example, the process 400 can check each index of Y2v to determine whether the index is equal to 1, and if so, can set the same index in Y_indices equal to 1. Y_indices can then be used to derive the indices in Xv of the max value. When the max value occurs more than once in Xv, this information is captured in Y_indices. To perform the operations at step 426, the process 400 can use, for example, an instruction called TensorTensorOp, with Y_indices and Y2v provided as inputs, and with a parameter indicating performing a logical "OR" using the two inputs.

The process 400 next uses Y2v, at step 428, to perform a preliminary step in updating the values of Xv. At step 428, for each index of Y2v that is equal to 1, the process 400 sets the same index in Y3v to a value representing negative infinity. Negative infinity can be represented, for example, using a binary equivalent of −1, a value having all bit positions set to 1, or another encoded value that can be used to indicate negative infinity. Alternatively, in some examples, the process 400 can use a value of zero instead of negative infinity, such as when the values in Xv will always be greater than zero. Alternatively, in some examples, the process 400 can use the negative of the max value found at step 416. To perform the operations at step 428, the process 400 can use, for example, an instruction called TensorScalarOp, with Y2v and the value representing negative infinity (or −1, or another low value) as inputs, and a parameter indicating that the two values are to be multiplied to each other.

At step 430, the process 400 next sums each index of Xv with each respective index of Y3v. At indices where Y3v is zero, the Xv[index] will remain the same, while at indices where Y3v is negative infinity, Xv[index] will now also be negative infinity (or zero, or another minimum number). The result of step 430 is that each occurrence of the max value found at step 420 has now been replaced with the lowest possible number, such that, should the process 500 return to step 416 and proceed from step 416 trough to step 420, the next largest value will be found.

The process 400 next proceeds to step 432, where j is incremented by one. The process then proceeds to step 412, and determines whether k values have been found.

When the process 400 terminates, Y_values will be the same in all partitions, and each partition will have the top-k values from among the values of Xv. Additionally, Y_indices will be a vector that has a value of 1 at each index where the largest values were found.

The process 400 of FIG. 4 is one example of a process that can be used to perform a top-k computation on a neural network accelerator. In various examples, the steps of the process 400 can be modified so that the output is organized differently. For example, the steps of the process 400 can be modified so that the top-k values are in one memory partition instead of duplicated in each memory partition. As another example, the Y_indices may not be needed, and determination of the Y_indices can be left out. As another example, the hardware may have different instructions available than the instructions illustrated here, in which it may be possible to combine some steps, or additional steps may be needed.

It should also be noted that, in some examples, the accelerator may not include instructions for performing loops and conditional checks, such as is illustrated by step 412 and step 432. In these examples, looping can be accomplished by, for example, by reloading the instructions that perform steps 414 through 430 into the accelerator, where instructions are generated at compile time control how many times the instructions are reloaded. Reloading of the instructions can be performed, for example, by one or more of a Direct Memory Access (DMA engine) and a component of the accelerator for managing movement of data into and out of the accelerator.

Figure 5:
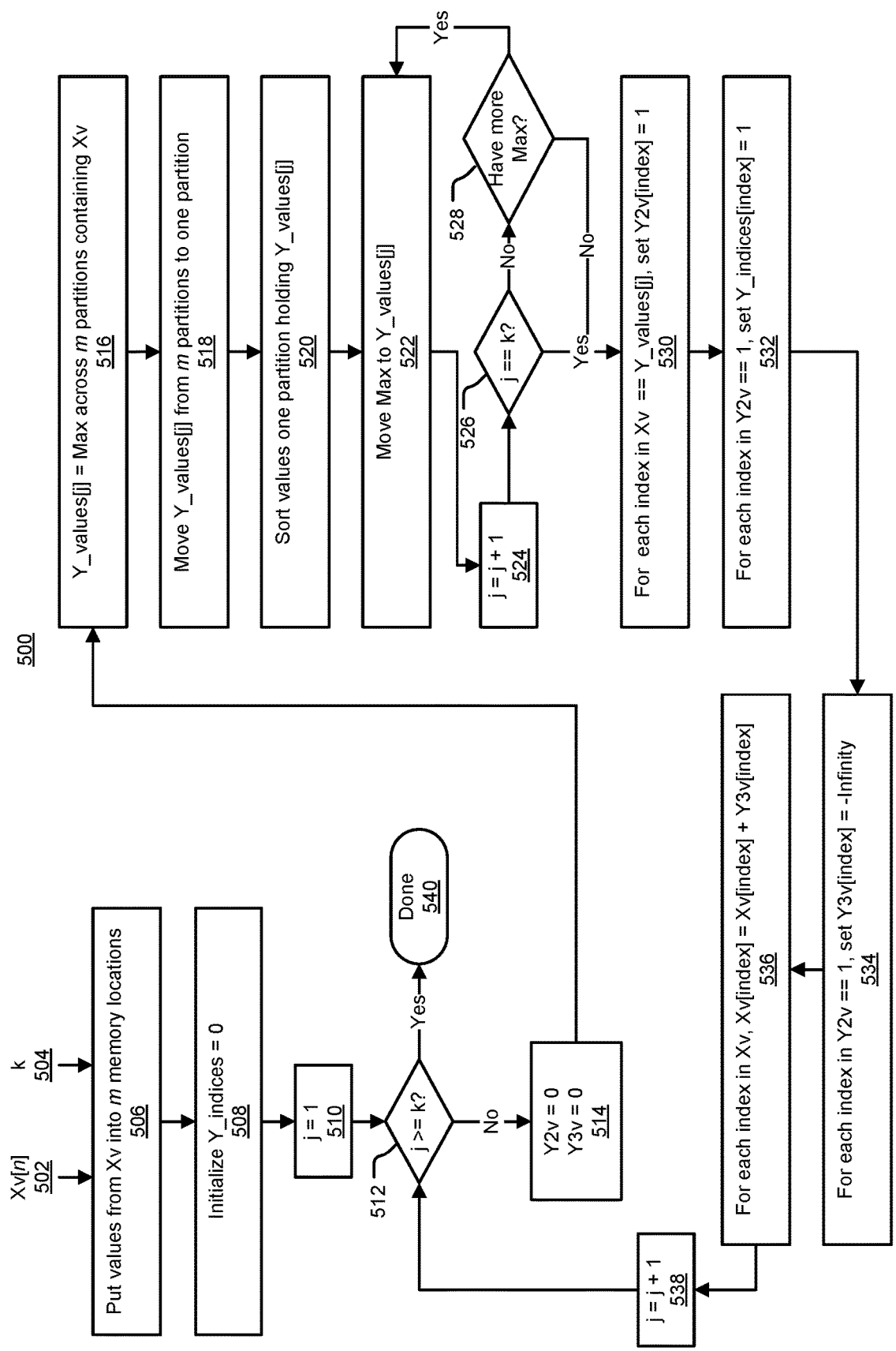
FIG. 5 includes a flowchart illustrating another example of a process for computing the top-k values for a set of input values.

FIG. 5 includes a flowchart illustrating another example of a process 500 for computing the top-k values for a set of input values. In various examples, the process 500 can be performed by a compiler that generates instructions for the example accelerator of FIG. 2. In these examples, the accelerator, when executing the instructions, then performs the steps of the process 500. For example, one or more of the steps of the process 500 of FIG. 5 can be performed by the pooling engine, the activation engine, and/or the processing engine array. In various examples, the process 500 can be embodied as a set of program instructions for the accelerator, where the accelerator will perform the steps of the process 500 when the accelerator executes the instructions.

The example process 500 receives as input Xv[n] 502 and k 504, where Xv[n] 502 is a set of values on which the top-k computation is to be performed and k 504 is the number of largest values to find. In the example of FIG. 5, the process 500 finds the largest values in Xv, including duplicates, and stores these values in a set of values referred to as Y_values. In some examples, Y_values is a matrix of values that is as wide as the number of execution engines and is k deep. In these examples, the values of Y_values can be stored across partitions, with each partition being configured to store k values. The process 500 also stores the locations, in Xv, where the values in Y_values were found in a mask referred to as Y_indices. Y_indices can have the same number of indices as Xv (e.g., n indices). In some examples, generation of Y_indices may be optional.

At step 506, the process 500 may perform a preliminary step of placing values from Xv in m different partition of the accelerator's memory array, where m can be less than or equal to the number of execution channels. To perform this step, the process 500 can use instructions such as "Mem-Copy," "RegLoad," "RegStore," or a combination of these instructions. This step may be performed, for example, when the number of values on Xv exceeds the number of execution channels, so that all execution channels can be utilized for the operations at step 516. When the number of values in Xv is less than the number of execution channels, in some examples, the process 500 also executes step 506 to put groups of values of Xv into different execution channels. In these and other examples, the process 500 divides the work of finding the largest value among the available resources so that the work can be performed more efficiently. In some examples, step 506 can be skipped, or step 506 can include putting all the values in Xv into one partition if the values are not already in one partition.

At step 508, the process 500 next performs the preliminary step of setting each index of Y_indices to 0. In various examples, Y_indices is located in one memory partition, and can occupy a set of memory locations that may be, though need not be, contiguous. In some examples, each index in Y_indices is in a different memory partition. Each index in Y_indices can be a 1-bit value, or the smallest-size value that is defined for the instruction set of the accelerator.

At step 510, the process 500 next performs the preliminary step of setting a variable j equal to 0. The variable j is used in the process 500 to count the number of largest values found so far. Thus, at step 512, the process 500 tests whether j is greater than or equal to k. When j is greater than equal to k, the process 500 proceeds to step 540 and terminates. When j is not greater than or equal to k, the process 500 proceeds to step 514.

At step 514, the process 500 prepares two intermediate variables, Y2v and Y3v, by setting these variables equal to zero. The variables Y2v and Y3v can each be a set of values having the same number of indices as Xv (e.g., n indices). In some examples, each index of Y2v and/or of Y3v are stored in the same partition (with Y2v and Y3v not necessarily being in the same partition), so that the values in Y2v or Y3v can be operated on in the same channel. In some examples, each index of Y2v and Y3v can be stored in a different partition, so that each index is in a separate execution channel.

At step 516, the process 500 determines the maximum value in each of the m partitions that contain the values of Xv, and stores the result at Y_values[j]. In this case, Y_values can be configured such that Y_values[j] (and all other indices of Y_values) is an array of values having an index for each execution channel. The process 500 can perform step 516, for example, using the execution engines in the pooling engine or the activation engine. Performing this step can include, for example, having each execution engine read two values from the partition assigned to the execution engine; having the execution engine perform a max value comparison and writing the result to a respective index of Y_values[j]; having the execution engine read the last max value from the index of Y_values[j] and a next value from the partition, and again performing a max value comparison and writing the result to the respective index of Y_values[j]; and repeating this process until each index of Y_values[j] holds the maximum value from each partition.

In various examples, the operations of step 516 can be performed using one instruction for the pooling or activation engines, which may be called TensorReduceOp. In these examples, the TensorReduceOp instruction can be given Xv as an input the parameter "max" to indicate that the execution engines are to find the maximum value from among the inputs.

At step 518, moves the values in Y_values[j] from the multiple partitions of step 516 to one partition. For example, the process 500 can instruct the execution engines to perform a parallel load of the values in Y_values[j] (using, for example, a "RegLoad" instruction) into the set of registers associated with the different partitions (e.g., the set of registers 230 in the memory subsystem 204, or located elsewhere, as illustrated in FIG. 2), followed by a serial store (using, for example, a "RegStore" instruction) to copy the values from the set of registers into one partition. Upon completion of step 518, the one partition will be holding the m maximum values found at step 516, which will include the absolute maximum as well as any duplicates of the absolute maximum.

At step 520, the process 500 next sorts the m values in the one partition from largest to smallest. To perform this step, the process 500 can use, for example, a TensorSort instruction, with the one partition as the input. This instruction can implement one or more of various types of sorting algorithms, such as quicksort, merge sort, heap sort, insertion sort, and so on. The sorting can be performed on values in Y_values[j], while the files are stored in the one partition, and may require multiple cycles of reading values and writing values to new locaitons. Upon completion of this step, the m values will still be in the one partition, but will be reorganized from largest to smallest.

At step 522, the process 500 next copies the first maximum value from the one partition to each of the partitions of Y_values[j]. The process 500 can identify the first maximum value to referring to the first value of the m values in the one partition. To copy this value to Y_values[j], the process 500 can instruct the execution engines, for example, to perform a serial load of the one value into the set of registers for moving data between the memory partitions, then performing a parallel load from the set of registers to partitions, at the location of Y_values[j].

At step 524, the process 500 next increments j. As noted above, the process 500 is looking for the largest values in Xv, including duplicates, and after step 522 one has been found. The process 500 next proceeds to step 526, and tests whether j is equal to k. When j is equal to k, the process 500 proceeds to step 530. When j is not equal to k, the process 500 proceeds to step 528.

At step 528, the process 500 tests whether there are any more copies of the first maximum value (the value copied at step 522 from the one partition to Y_values[j]) in the one partition. This step is searching for duplicates of the first maximum value, which can be found in the sorted values stored in the one partition. For example, the process 500 can maintain an index of the values in the one partition, and, at the end of performing step 522, can increment the index to the next value. Then, at step 528, the process 500 can examine the next value, and see if the next value is the same as the first value copied at step 522. If so, the process 500 returns to step 522 to copy this value into the partitions of Y_values [j]. When, at step 528, the process 500 finds that the next value is not the same as the first value, then the process 500 proceeds to step 530.

At step 530, the process 500 next determines the indices in Xv where the first max value was found. To find these indices, the process 500 can, for example, check each index of Xv to see if the value at the index is equal to the max value found at step 522. When an index of Xv is equal to the max value, the process 500 sets a corresponding index of Y2v equal to 1. All other indices of Y2v are left at 0, such, on the completion of step 530, Y2v is a bitmask reflecting the indices within Xv where the max value was found. The process 500 can accomplish the operations at step 530 using, for example, an instruction called TensorScalarPtrOp, with the Xv values and the value at Y_values[ ] provided as inputs, and a parameter to indicate finding values in Xv that are equal to Y_values[ ].

At step 532, the process 500 next uses the Y2v value to update the Y_indices. For example, the process 500 can check each index of Y2v to determine whether the index is equal to 1, and if so, can set the same index in Y_indices equal to 1. Y_indices can then be used to derive the indices in Xv of the max value. When the max value occurs more than once in Xv, this information is captured in Y_indices. To perform the operations at step 532, the process 500 can use, for example, an instruction called TensorTensorOp, with Y_indices and Y2v provided as inputs, and with a parameter indicating performing a logical "OR" using the two inputs.

The process 500 next uses Y2v, at step 534, to perform a preliminary step in updating the values of Xv. At step 534, for each index of Y2v that is equal to 1, the process 500 sets the same index in Y3v to a value representing negative infinity. Negative infinity can be represented, for example, using a binary equivalent of −1, a value having all bit positions set to 1, or another encoded value that can be used to indicate negative infinity. Alternatively, in some examples, the process 400 can use a value of zero instead of negative infinity, such as when the values in Xv will always be greater than zero. Alternatively, in some examples, the process 500 can use the negative of the max value found at step 522. To perform the operations at step 534, the process 500 can use, for example, an instruction called TensorScalarOp, with Y2v and the value representing negative infinity (or −1, or another low value) as inputs, and a parameter indicating that each index of Y2v is to be multiplied with the value representing negative infinity.

At step 536, the process 500 next sums each index of Xv with each respective index of Y3v. At indices where Y3v is zero, the Xv[index] will remain the same, while at indices where Y3v is negative infinity, Xv[index] will now also be negative infinity (or zero, or another minimum number). The result of step 536 is that each occurrence of the max value found at step 522 has now been replaced with the lowest possible number, such that, should the process 500 return to step 516 and proceed from step 516 trough to step 522, the next largest value will be found (including any duplicates).

The process 500 next proceeds to step 538, where j is incremented by one. The process 500 then proceeds to step 512. At this point, it may be that, due to duplicates, the k largest values have been found, in which cakes the process 500 will proceed to step 540 and terminate. When, even including duplicates, the k largest values have not yet been found, the process 500 proceeds again to step 514 to find the next largest value or values.

When the process 500 terminates, Y_values will be the same in all partitions, and each partition will have the top-k values from among the values of Xv. Additionally, Y_indices will be a vector that has a value of 1 at each index where the largest values were found.

The process 500 of FIG. 5 is one example of a process that can be used to perform a top-k computation on a neural network accelerator. In various examples, the steps of the process 500 can be modified so that the output is organized differently. For example, the steps of the process 500 can be modified so that the top-k values are in one memory partition instead of duplicated in each memory partition. As another example, the Y_indices may not be needed, and determination of the Y_indices can be left out. As another example, the hardware may have different instructions available than the instructions illustrated here, in which it may be possible to combine some steps, or additional steps may be needed.

It should also be noted that, in some examples, the accelerator may not include instructions for performing loops and conditional checks, such as is illustrated by step 512 and 514 and steps 524, 526, and 528. In these examples, looping can be accomplished by, for example, by reloading the instructions that perform steps 514 through 522 and steps 530 through 536 into the accelerator, where instructions are generated at compile time control how many times the instructions are reloaded. Reloading of the instructions can be performed, for example, by one or more of a DMA engine and a component of the accelerator for managing movement of data into and out of the accelerator.

Figure 6:
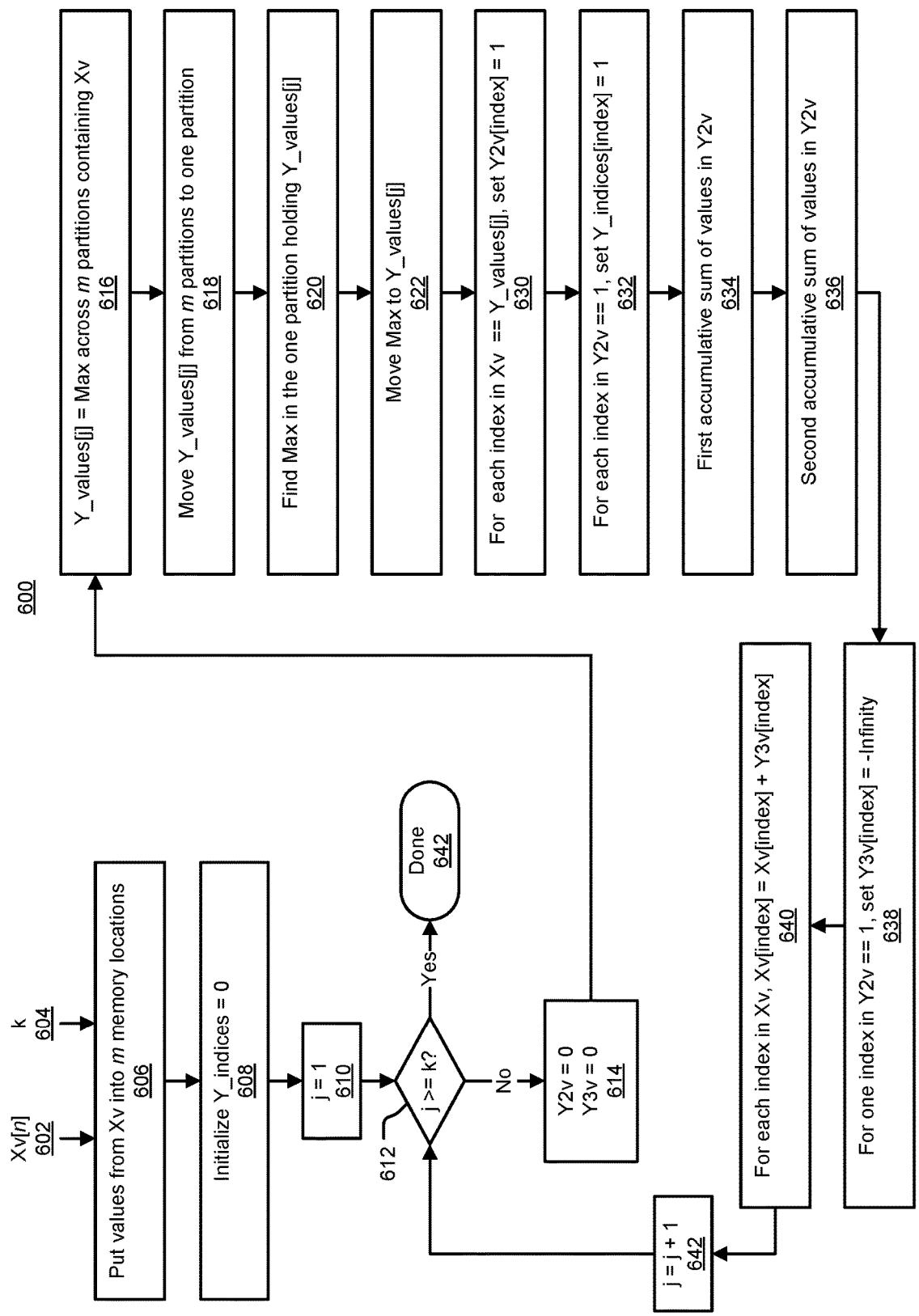
FIG. 6 includes a flowchart illustrating another example of a process for computing top-k values for a set of input values.

FIG. 6 includes a flowchart illustrating another example of a process 600 for computing top-k values for a set of input values. In various examples, the process 600 can be performed by a compiler that generates instructions for the example accelerator of FIG. 2. In these examples, the accelerator, when executing the instructions, then performs the steps of the process 600. For example, one or more of the steps of the process 600 of FIG. 6 can be performed by the pooling engine, the activation engine, and/or the processing engine array. In various examples, the process 600 can be embodied as a set of program instructions for the accelerator, where the accelerator will perform the steps of the process 600 when the accelerator executes the instructions.

The example process 600 receives as input Xv[n] 602 and k 604, where Xv[n] 602 is a set of values on which the top-k computation is to be performed and k 604 is the number of largest values to find. In the example of FIG. 6, the process 600 finds the largest values in Xv, including duplicates, and stores these values in a set of values referred to as Y_values. In some examples, Y_values is a matrix of values that is as wide as the number of execution engines and is k deep. In these examples, the values of Y_values can be stored across partitions, with each partition being configured to store k values. The process 600 also stores the locations, in Xv, where the values in Y_values were found in a mask referred to as Y_indices. Y_indices can have the same number of indices as Xv (e.g., n indices). In some examples, generation of Y_indices may be optional.

At step 606, the process 600 may perform a preliminary step of placing values from Xv in m different partition of the accelerator's memory array, where m can be less than or equal to the number of execution channels. To perform this step, the process 600 can use instructions such as "Mem-Copy," "RegLoad," "RegStore," or a combination of these instructions. This step may be performed, for example, when the number of values on Xv exceeds the number of execution channels, so that all execution channels can be utilized for the operations at step 616. When the number of values in Xv is less than the number of execution channels, in some examples, the process 600 also executes step 606 to put groups of values of Xv into different execution channels. In these and other examples, the process 600 divides the work of finding the largest value among the available resources so that the work can be performed more efficiently. In some examples, step 606 can be skipped, or step 606 can include putting all the values in Xv into one partition if the values are not already in one partition.

At step 608, the process 600 next performs the preliminary step of setting each index of Y_indices to 0. In various examples, Y_indices is located in one memory partition, and can occupy a set of memory locations that may be, though need not be, contiguous. In some examples, each index in Y_indices is in a different memory partition. Each index in Y_indices can be a 1-bit value, or the smallest-size value that is defined for the instruction set of the accelerator.

At step 610, the process 600 next performs the preliminary step of setting a variable j equal to 0. The variable j is used in the process 600 to count the number of largest values found so far. Thus, at step 612, the process 600 tests whether j is greater than or equal to k. When j is greater than equal to k, the process 600 proceeds to step 642 and terminates. When j is not greater than or equal to k, the process 600 proceeds to step 614.

At step 614, the process 600 prepares two intermediate variables, Y2v and Y3v, by setting these variables equal to zero. The variables Y2v and Y3v can each be a set of values having the same number of indices as Xv (e.g., n indices). In some examples, each index of Y2v and/or of Y3v are stored in the same partition (with Y2v and Y3v not necessarily being in the same partition), so that the values in Y2v or Y3v can be operated on in the same channel. In some examples, each index of Y2v and/or Y3v can be stored in a different partition, so that each index is in a separate execution channel.

At step 616, the process 600 determines the maximum value in each of the m partitions that contain the values of Xv, and stores the result at Y_values[j]. In this case, Y_values can be configured such that Y_values[j] (and all other indices of Y_values) is an array of values having an index for each execution channel. The process 600 can perform step 616, for example, using the execution engines in the pooling engine or the activation engine. Performing this step can include, for example, having each execution engine read two values from the partition assigned to the execution engine; having the execution engine perform a max value comparison and writing the result to a respective index of Y_values[j]; having the execution engine read the last max value from the index of Y_values[j] and a next value from the partition, and again performing a max value comparison and writing the result to the respective index of Y_values[j]; and repeating this process until each index of Y_values[j] holds the maximum value from each partition.

In various examples, the operations of step 616 can be performed using one instruction for the pooling or activation engines, which may be called TensorReduceOp. In these examples, the TensorReduceOp instruction can be given Xv as an input the parameter "max" to indicate that the execution engines are to find the maximum value from among the inputs.

At step 618, moves the values in Y_values[j] from the multiple partitions of step 616 to one partition. For example, the process 600 can instruct the execution engines to perform a parallel load of the values in Y_values[j] (using, for example, a "RegLoad" instruction) into the set of registers associated with the different partitions (e.g., the set of registers 230 in the memory subsystem 204, or located elsewhere, as illustrated in FIG. 2), followed by a serial store (using, for example, a "RegStore" instruction) to copy the values from the set of registers into one partition. Upon completion of step 618, the one partition will be holding the m maximum values found at step 616, which will include the absolute maximum as well as any duplicates of the absolute maximum.

At step 620, the process 600 finds the maximum value from among the maximum values determined at step 616 and moved to one partition in step 618. The process 600 can use, for example, the TensorReduceOp instruction again, this time indicating the one partition, where all the value were moved to in step 618, as an input. Once step 620 is complete, the process 600 has found the largest value from among the original values in Xv. At step 622, the process 600 can move this value from the partition where value was found to Y_values[j], so that Y_values[j] now holds the largest value found so far. To move the max value, the process 600 can, for example, instruct the execution engines to perform a serial of load the value into the set of registers for moving data between memory partitions, and then perform a parallel load into the partitions at the locations of Y_values[j].

At step 630, the process 600 next determines each of the indices in Xv where the max value was found. To find these indices, the process 600 can, for example, check each index of Xv to see if the value at the index is equal to the max value found at step 620. When an index of Xv is equal to the max value, the process 600 sets a corresponding index of Y2$v$ equal to 1. All other indices of Y2$v$ are left at 0, such, on the completion of step 630, Y2$v$ is a bitmask reflecting the indices within Xv where the max value was found. The process 600 can accomplish the operations at step 630 using, for example, an instruction called TensorScalarPtrOp, with the Xv values and the value at Y_values[j] provided as inputs, and a parameter to indicate finding values in Xv that are equal to Y_values[j].

At step 632, the process 600 next uses the Y2$v$ value to update the Y_indices. For example, the process 600 can check each index of Y2$v$ to determine whether the index is equal to 1, and if so, can set the same index in Y_indices equal to 1. Y_indices can then be used to derive the indices in Xv where the top-k values were found, and thereby derive the values themselves. When the max value occurs more than once in Xv, this information is captured in Y_indices. To perform the operations at step 632, the process 600 can use, for example, an instruction called TensorTensorOp, with Y_indices and Y2$v$ provided as inputs, and with a parameter indicating performing a logical "OR" using the two inputs.

The process 600 will next remove the max value found at step 620 from the original set of values in Xv, so that the next max value can be found. Because the process 600 wants to capture duplicates if the current max value appears more than once, at step 634, the process 600 performs a first accumulative sum of the values in Y2$v$. The accumulative sum causes each value in a set of values to be added to each subsequent value, with the sum replacing the original value. For example, given the set of values (1, 2, 3, 4, 5), an accumulative sum operation on this set would result in the set of values being turned into (1, 3, 6, 10, 15). In the case of step 634, Y2$v$ includes only the values zero and one, and after the accumulative sum operation is performed on Y2$v$, two indices of Y2$v$ will be equal to one. For example, assuming Y2$v$ includes the values (0, 0, 1, 0, 1, 0, 1, 1), after step 634, Y2$v$ will have the values (0, 0, 1, 1, 2, 2, 3, 4). The accumulative sum can be performed, for example, by the execution engines of the activation engine or the pooling engine. An execution engine can, for example, successively read the set of input values, compute and maintain a running sum, and for each input value write a new value to the memory partition where the values are stored. The accumulative sum can be performed, for example, using an instruction called TensorAccumulateOp, which operates on a set of values in one partition.

In some cases, once the accumulative sum is performed on Y2$v$ at step 634, one index of Y2$v$ will have the value of one, but in some cases, two indices will have a value of one. Because of the latter possibility, at step 636, the process 600 performs a second accumulative sum on the values in Y2$v$. Returning to the prior example, if the input to step 636 is the set of values (0, 0, 1, 1, 2, 2, 3, 4), after step 636, Y2$v$ will have the values (0, 0, 1, 2, 4, 6, 9, 13).

At step 638, the process 600 next identifies the one index of Y2$v$ that is equal to 1, and sets the corresponding index in Y3$v$ to a value representing negative infinity. At step 640, the process 600 then sums each index of Xv with each respective index of Y3$v$. At indices where Y3$v$ is zero, the Xv[index] will remain the same, while at indices where Y3$v$ is negative infinity, Xv[index] will now also be negative infinity (or zero, or another minimum number). At the end of step 640, one occurrence of the max value found at step 620 will now be set to negative infinity or another minimum possible number (e.g., zero). Other occurrences of the max value, however, will still be present, such that, should the process 600 return to step 616, on such other occurrence will be found.

The process 600 next proceeds to step 642, where j is incremented by one. The process 600 then proceeds to step 612, where the process 600 may continue and look for the next largest value, or may terminate.

When the process 600 terminates, Y_values will be the same in all partitions, and each partition will have the top-k values from among the values of Xv. Additionally, Y_indices will be a vector that has a value of 1 at each index where the largest values were found.

The process 600 of FIG. 6 is one example of a process that can be used to perform a top-k computation on a neural network accelerator. In various examples, the steps of the process 600 can be modified so that the output is organized differently. For example, the steps of the process 600 can be modified so that the top-k values are in one memory partition instead of duplicated in each memory partition. As another example, the Y_indices may not be needed, and determination of the Y_indices can be left out. As another example, the hardware may have different instructions available than the instructions illustrated here, in which it may be possible to combine some steps, or additional steps may be needed.

It should also be noted that, in some examples, the accelerator may not include instructions for performing loops and conditional checks, such as is illustrated by step. In these examples, looping can be accomplished by, for example, by reloading the instructions that perform steps 614 through 622 and steps 630 through 640 into the accelerator, where instructions are generated at compile time control how many times the instructions are reloaded. Reloading of the instructions can be performed, for example, by one or more of a DMA engine and a component of the accelerator for managing movement of data into and out of the accelerator.

FIG. 7 includes a flowchart illustrating an example of a process 700 for determining the top-k values in a set of numerical values. The example process 700 can be implemented, for example, by a compiler for an integrated circuit device, such as the accelerator illustrated in FIG. 2. In various examples, an integrated circuit device can include a memory operable to store the instructions generated by the compiler. The integrated circuit device can further include a computational engine that includes a plurality of execution engines. In these examples, the instructions can cause the computational engine to perform operations including the steps of the process 700.

In some examples, the plurality of execution engines of the integrated circuit device can perform parallel computations on different values or one computation across multiple values. The computations can include arithmetic, logical, and/or comparative computations.

In some examples, the memory of the integrated circuit device includes a plurality of non-overlapping partitions. In these examples, each execution engine from the plurality of execution engines is assigned to a respective partition from the plurality of non-overlapping partitions. Also in these examples, each execution engine can read from or write to only the respective partition with which the execution engine is associated. In these and other examples, the integrated circuit device can further include a set of registers each associated with a respective partition from the plurality of non-overlapping partitions, the set of registers enabling copying of data between the partitions.

At step 702, the process 700 includes reading, from a memory of an integrated circuit device, a first set of numerical values, wherein the integrated circuit device uses the memory to store values being operated on and results of operations on the values. In some examples, the first set of numerical values are read from one memory partition. In some examples, the first set of numerical values are read from multiple memory partitions. In various examples, the first set of numerical values represent scores assigned to a respective set of results. For example, the first set of numerical values can be the result of a softmax computation. As a further example, each of the first set of numerical values can be associated with a label or tag or another identifier.

At step 704, the process 700 includes determining, using a computational engine of the integrated circuit device, a first numerical value from among the first set of numerical values, wherein the first numerical value is a maximum value from among the first set of numerical values. In some examples, determining the first numerical value can include determining a largest value from among the values read from one memory partition. In some examples, determining the first numerical value can include determining the largest value in each of multiple memory partitions, and then determining the largest value across the multiple memory partitions.

In some examples, determining the first numerical value results in an intermediate set of values being stored in different partitions of the memory. In these examples, the process 700 can further include moving the intermediate set of values to one partition of the memory, and determining the first numerical value by computing a maximum from among the intermediate set of values.

At step 706, the process 700 includes writing the first numerical value to the memory at a first memory location corresponding to an index in a second set of numerical values.

In some examples, the first set of numerical values includes more than one occurrence of the first numerical value. In some examples, the process 700 can further include writing the first numerical value to memory locations corresponding to the second set of numerical values for each occurrence of the first numerical value. In some examples, the process 700 can, alternatively or additionally, include writing indices associated with each occurrence of the first numerical value to memory locations corresponding to third set of numerical values, the third set of numerical values indicating locations in the first set of numerical values of the first numerical value.

At step 708, the process 700 includes determining, using the computational engine, an index in the first set of numerical values of an occurrence of the first numerical value. The process 700 can, for example, compare the first numerical value against each numerical value in the first set of numerical values, and record the indices where the first numerical value is equal to a numerical value in the first set of numerical values.

In some examples, the process 700 can further include writing a value of zero or one to a set of memory locations corresponding to a mask, the mask having a zero or one value for each index in the first set of numerical values. In these examples, a one value is written for each index in the set of indices for each occurrence of the first numerical value and a zero value is written for each other index.

In some examples, the process 700 can further include writing a value to a mask stored in the memory at a memory location corresponding to the index in the first set of numerical values, the value indicating that the first numerical value was found at the index.

At step 710, the process 700 includes writing, to the memory, a value representing negative infinity at the index in the first set of numerical values. The perform this step, the process 700 can, in some examples, include generating, using the computational engine, a third set of numerical values by multiplying each index in the mask by a value representing negative infinity. In these examples, the process 700 can further include computing, using the computational engine, sums of each index of the third set of numerical values with each corresponding index of the first set of numerical values, and writing the sums to the memory at a location of the first set of numerical values to set each occurrence of the first numerical value to a minimum value.

Alternatively or additionally, in some examples, to update the first set of numerical values, the process 700 can include writing a positive value to an intermediate mask using the index in the first set of numerical values, wherein all other indices in the intermediate mask are a negative value. In these examples, the process 700 can further include updating a mask stored in the memory by performing a logical or operation using the mask and the intermediate mask. The mask indicates a location in the first set of numerical values where the first numerical value was found. The process 700 can further include generating an intermediate set of values by multiplying each index in the intermediate mask by the value representing negative infinity. The process 700 can then use the intermediate set of values when writing the value representing negative infinity at the index in the first set of numerical values.

At step 712, the process 700 includes outputting the second set of numerical values, the second set of numerical values including a set of largest values from among the first set of numerical values.

In some examples, the process 700 can further include determining a next maximum value from among the first set of numerical values until a quantity of the second set of numerical values is equal to a pre-determined limit. The pre-determined limit can be set to the value of "k" in the top-k computation.

In some examples, the process 700 can further include using the second set of numerical values to determine a next operation. For example, the second set of numerical values can be an input to a subsequent layer of a neural network. In these and other examples, the integrated circuit device can include a neural network accelerator.

In some examples, the process 700 can further include generating a set of instructions for the integrated circuit device, where the instructions, when executed by the integrated circuit device, cause the integrated circuit device to perform the steps of the process 700.

Figure 8:
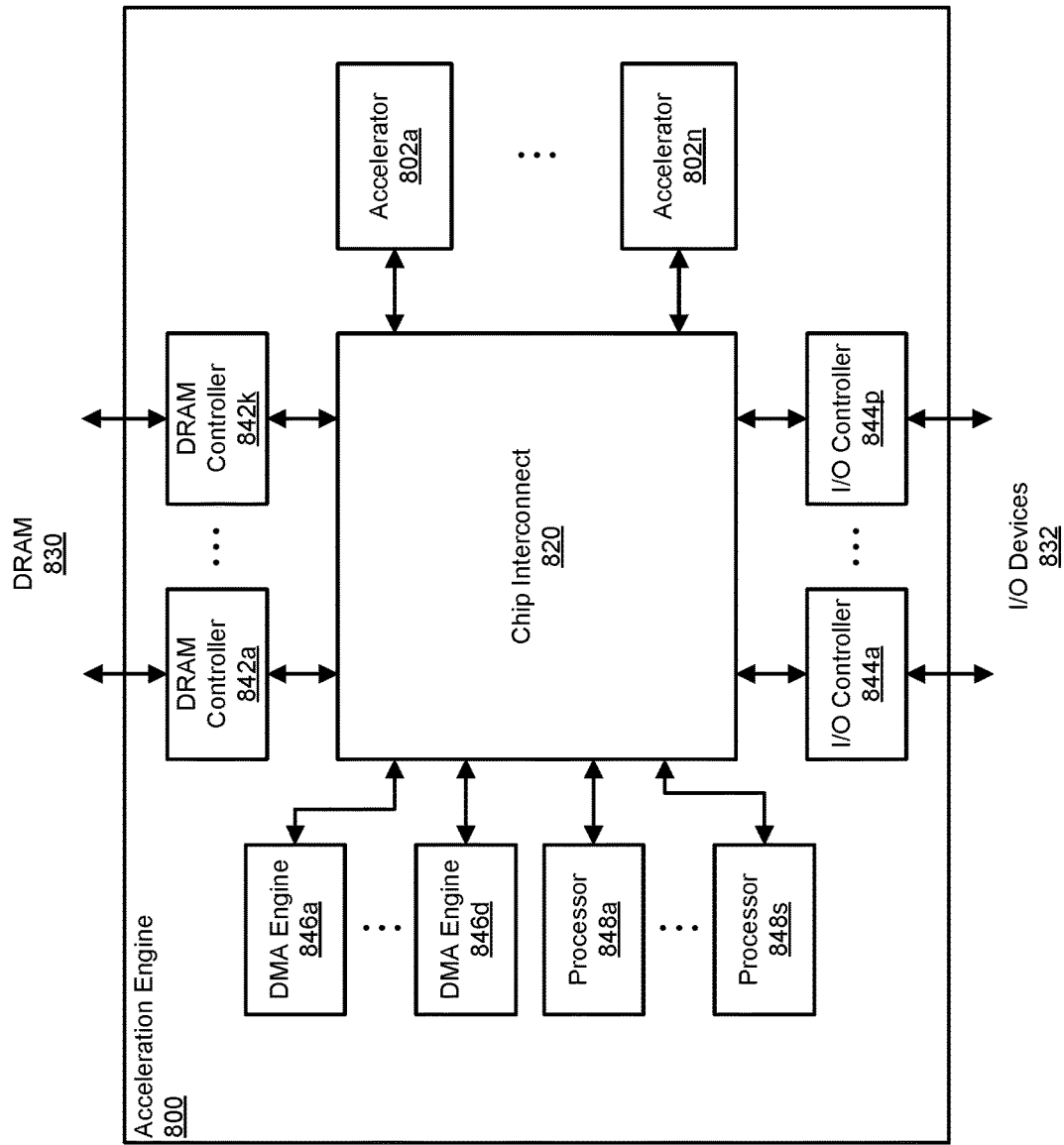
FIG. 8 includes a block diagram that illustrates an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 2.

In the example of FIG. 8, the acceleration engine 800 includes multiple accelerators 802a-802n, each of which can perform a set of operations. In various examples, the accelerators 802a-802n for particular types of operations, so that the accelerators 802a-802n can perform the operations much faster than when similar operations are performed by a general purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includesp I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into (e.g., on the same silicon die) the device. In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d is determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
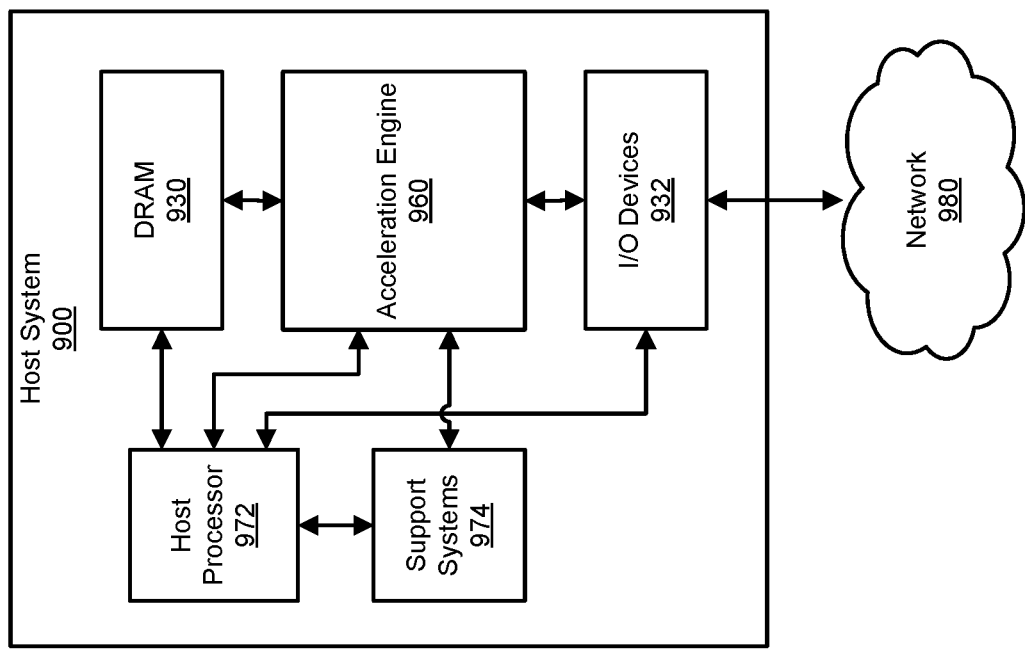
FIG. 9 includes a block diagram that illustrates an example of a host system.

FIG. 9 includes a block diagram that illustrates an example of a host system 900 in which an acceleration engine 960 can be used. The acceleration engine 960 of FIG. 9 is an example of a device that can include one or more accelerator engines such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general purpose integrated circuit that is capable of executing program instructions. In some examples, the host processor 972 can include multiple processing cores. A multi-core processor may include multiple processing units within the same processor In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For the example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 10:
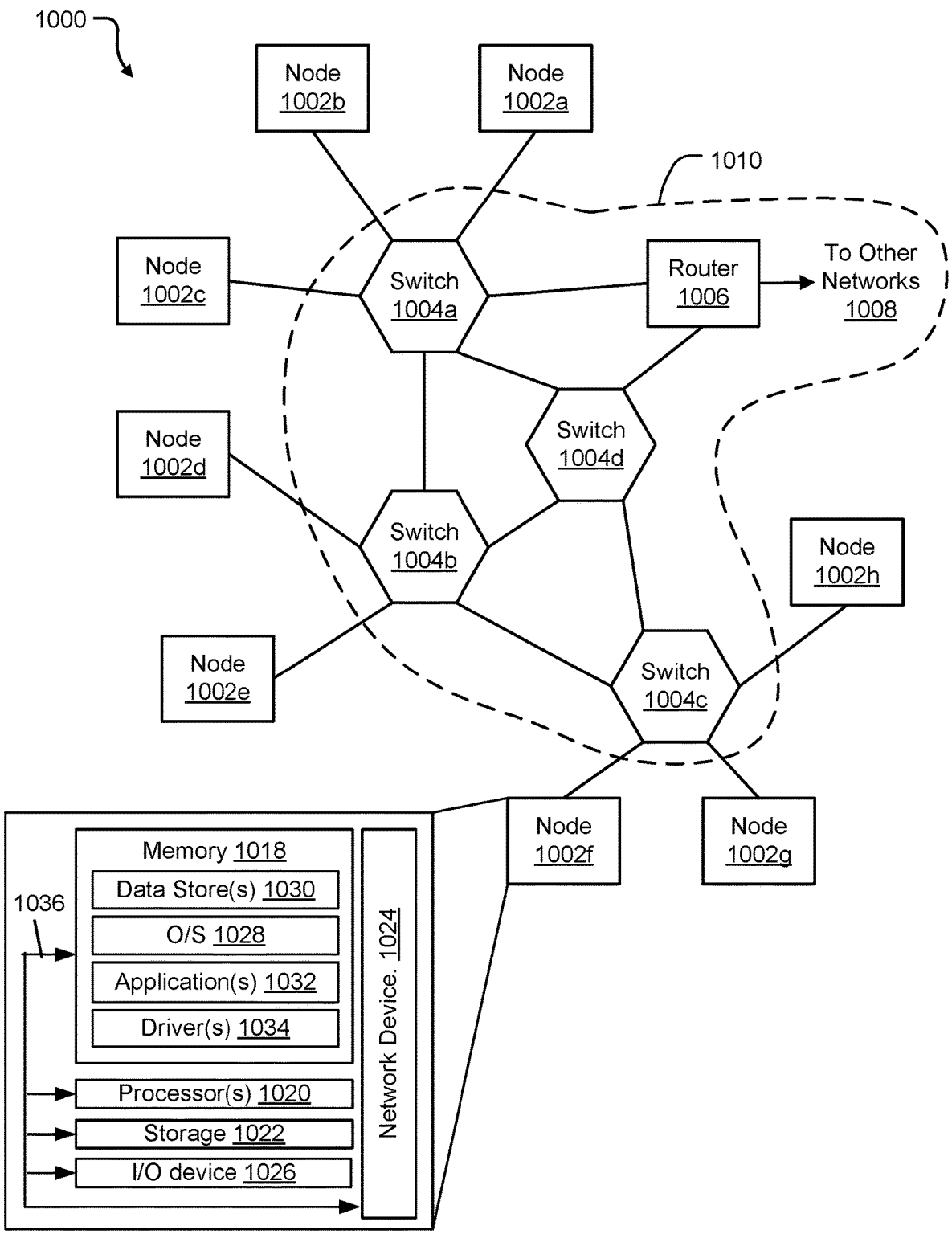
FIG. 10 includes a diagram of an example network.

FIG. 10 includes a diagram of an example network 1000, which can include one or more host systems, such as the host system illustrated in FIG. 9. For example, the example network 1000 of FIG. 10 includes multiple nodes 1002*a*-1002*h*, one or more of which can be a host system such as is illustrated in FIG. 9. Others of the nodes 1002*a*-1002*h* can be other computing devices, each of which include at least a memory for storing program instructions, a processor for executing the instructions, and a network interface for connecting to the network 1000.

In various examples, the network 1000 can be used to process data. For example, input data can be received at one of the nodes 1002*a*-1002*h* or from other networks 1008 with which the network 1000 can communicate. In this example, the input data can be directed to a node in the network 1000 that includes an acceleration engine, for the acceleration engine to operate on and produce a result. The result can then be transferred to the node or other network from which the input data was received. In various examples, input data can be accumulated from various sources, including one or more of the nodes 1002*a*-1002*h* and/or computing devices located in the other networks 1008, and the accumulated input data can be directed to one or more host systems in the network 1000. Results from the host systems can then be distributed back to the sources from which the input data was gathered.

In various examples, one or more of the nodes 1002*a*-1002*h* can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 10, the nodes 1002*a*-1002*h* are connected to one another using a switched architecture with point-to point links. The switched architecture includes multiple switches 1004*a*-1004*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1004*a*-1004*d* of FIG. 10 may be connected to the nodes 1002*a*-1002*h* and provide multiple paths between any two nodes.

The network 1000 may also include one or more network devices for connection with other networks 1008, such as a router 1006. Routers use headers and forwarding tables to determine the best path for forwarding the packets, and use protocols such as internet control message protocol (ICMP) to communicate with each other and configure the best route between any two devices. The router 1006 of FIG. 10 can be used to connect to other networks 1008 such as subnets, LANs, wide area networks (WANs), and/or the Internet.

In some examples, network 1000 may include any one or a combination of many different types of networks, such as cable networks, the Internet, wireless networks, cellular networks and other private and/or public networks. The interconnected switches 1004*a*-1004*d* and the router 1006, if present, may be referred to as a switch fabric 1010, a fabric, a network fabric, or simply a network. In the context of a computer network, terms "fabric" and "network" may be used interchangeably herein.

The nodes 1002*a*-1002*h* may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for determining a set of largest numerical values from among a first set of numerical values, comprising:
    reading, from a memory of an integrated circuit device, the first set of numerical values, wherein the integrated circuit device uses the memory to store values being operated on and results of operations on the values, and wherein the first set of numerical values represents scores assigned to a respective set of results;
    determining, using a computational engine of the integrated circuit device, a first numerical value from among the first set of numerical values, wherein the first numerical value is a maximum value from among the first set of numerical values;
    writing the first numerical value to the memory at a first memory location, the first memory location corresponding to an index in a second set of numerical values;
    determining, using the computational engine, a set of indices in the first set of numerical values of each occurrence of the first numerical value;
    writing a value of zero or one to a set of memory locations corresponding to a mask, the mask having a zero or one value for each index in the first set of numerical values, wherein a one value is written for each index in the set of indices for each occurrence of the first numerical value and a zero value is written for each other index;
    generating, using the computational engine, a third set of numerical values by multiplying each index in the mask by a value representing negative infinity;
    computing, using the computational engine, sums of each index of the third set of numerical values with each corresponding index of the first set of numerical values;
    writing the sums to the memory at a location of the first set of numerical values to set each occurrence of the first numerical value to a minimum value; and
    outputting the second set of numerical values, the second set of numerical values including the first numerical value.

2. The computer-implemented method of claim 1, further comprising:
    generating a set of instructions for the integrated circuit device, the set of instructions including steps for determining the second set of numerical values.

3. The computer-implemented method of claim 1, further comprising:
    using the second set of numerical values to determine a next operation.

4. The computer-implemented method of claim 1, wherein the first set of numerical values is a result from a softmax computation.

5. The computer-implemented method of claim 1, wherein the integrated circuit device includes a neural network accelerator.

6. A computer-implemented method, comprising:
    receiving, by an integrated circuit device, a first set of numerical values;
    partitioning the first set of numerical values into multiple numerical value groups corresponding to multiple execution channels of a computational engine of the integrated circuit device, wherein each numeric value group is stored in a memory partition of a corresponding execution channel;
    determining a set of intermediate maximum values by determining a highest numerical value from each of the numerical value groups being processed by a corresponding execution channel;
    determining, using the computational engine of the integrated circuit device, a first numerical value from among the set of intermediate maximum values, wherein the first numerical value is a maximum value from among the first set of numerical values;
    writing the first numerical value to each memory partition corresponding to each of the multiple execution channels at a first memory location corresponding to an index in a second set of numerical values;
    determining, using the computational engine, a set of indices in the first set of numerical values of each occurrence of the first numerical value;
    writing, to each memory partition, a minimum value at each of the set of indices in the first set of numerical values; and
    outputting the second set of numerical values, the second set of numerical values including the first numerical value.

7. The computer-implemented method of claim 6, further comprising:
    determining a next maximum value from among the first set of numerical values until a quantity of the second set of numerical values is equal to a pre-determined limit.

8. The computer-implemented method of claim 6, further comprising:
    writing a value corresponding to a mask at a set of memory locations corresponding to the set of indices in the first set of numerical values, the value indicating that the first numerical value was found at each of the set of indices.

9. The computer-implemented method of claim 6, wherein the first set of numerical values includes more than one occurrence of the first numerical value.

10. The computer-implemented method of claim 9, further comprising:
writing the first numerical value to memory locations corresponding to the second set of numerical values for each occurrence of the first numerical value.

11. The computer-implemented method of claim 9, further comprising:
writing indices associated with each occurrence of the first numerical value to memory locations corresponding to a third set of numerical values, the third set of numerical values indicating locations in the first set of numerical values of the first numerical value.

12. The computer-implemented method of claim 6, further comprising:
writing a positive value to an intermediate mask using the set of indices in the first set of numerical values, wherein all other indices in the intermediate mask are a negative value.

13. The computer-implemented method of claim 12, further comprising:
updating a mask by performing a logical OR operation using the mask and the intermediate mask, wherein the mask indicates a location in the first set of numerical values where the first numerical value was found.

14. The computer-implemented method of claim 12, further comprising:
generating an intermediate set of values by multiplying each index in the intermediate mask by a value representing negative infinity; and
using the intermediate set of values when writing the value representing negative infinity at each of the set of indices in the first set of numerical values.

15. An integrated circuit device, comprising:
a memory operable to store values being operated on and results of operations on the values; and
a computational engine including a plurality of execution engines to implement multiple execution channels;
wherein the integrated circuit device is operable to:
receive a first set of numerical values;
partition the first set of numerical values into multiple numerical value groups corresponding to the multiple execution channels, wherein each numeric value group is stored in a memory partition of a corresponding execution channel in the memory;
determine a set of intermediate maximum values by determining a highest numerical value from each of the numerical value groups being processed by a corresponding execution channel;
determine, using the computational engine, a first numerical value from among the first set of numerical values, wherein the first numerical value is a maximum value from among the first set of numerical values;
write the first numerical value to each memory partition corresponding to each of the multiple execution channels at a first memory location corresponding to an index in a second set of numerical values;
determine, using the computational engine, a set of indices in the first set of numerical values of an occurrence of the first numerical value;
write, to the memory, a value representing negative infinity at each of the set of indices in the first set of numerical values; and
output the second set of numerical values, the second set of numerical values including the first numerical value.

16. The integrated circuit device of claim 15, wherein the plurality of execution engines are operable to perform parallel computations on different values or one computation across multiple values.

17. The integrated circuit device of claim 16, wherein the parallel computations and the one computation include arithmetic computations, logical computations, or comparative computations.

18. The integrated circuit device of claim 15, wherein the memory includes a plurality of non-overlapping partitions, wherein each execution engine from the plurality of execution engines is assigned to a respective partition from the plurality of non-overlapping partitions, and wherein each execution engine can read from or write to only the respective partition with which the execution engine is associated.

19. The integrated circuit device of claim 18, further comprising:
a set of registers, each associated with a respective partition from the plurality of non-overlapping partitions, the set of registers enabling copying of data between the non-overlapping partitions.

* * * * *